United States Patent
Oswald et al.

(10) Patent No.: US 6,640,176 B2
(45) Date of Patent: Oct. 28, 2003

(54) METHOD FOR DEPLOYING A RESTRAINT SYSTEM

(75) Inventors: Klaus Oswald, Wendlingen (DE); Torsten Grotendiek, Bietigheim-Bissingen (DE); Michael Roelleke, Leonberg-Hoefingen (DE); Klaus Minder, Esslingen (DE); Gerhard Loeckle, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/057,453

(22) Filed: Jan. 24, 2002

(65) Prior Publication Data
US 2002/0123835 A1 Sep. 5, 2002

(30) Foreign Application Priority Data
Jan. 24, 2001 (DE) .......................... 101 02 996

(51) Int. Cl.$^7$ ................................................ G06F 7/00
(52) U.S. Cl. ...................... 701/45; 180/268; 180/271; 280/734
(58) Field of Search ............................ 701/45, 46, 47; 180/268, 271, 282; 280/734, 735

(56) References Cited

U.S. PATENT DOCUMENTS 5,461,567 A * 10/1995 Kelley et al. .................. 701/45

* cited by examiner

Primary Examiner—Gertrude Arthur
(74) Attorney, Agent, or Firm—Kenyon & Kenyon

(57) ABSTRACT

A method for deployment of a restraint system is proposed, the acceleration in the direction of driving being increased as a function of the acceleration at right angles to the direction of driving and/or at a given angle relative to the direction of driving. This ensures that in particular crashes between 40 and 65 km/h can be detected more easily.

8 Claims, 3 Drawing Sheets

METHOD FOR DEPLOYING A RESTRAINT SYSTEM

FIELD OF THE INVENTION

The present invention is based on a method for deploying a restraint system.

BACKGROUND INFORMATION

It is known heretofore that a frontal collision of a vehicle can be detected by evaluating acceleration signals and/or summed acceleration signals that arise in the direction of driving via comparison with predefined deployment thresholds, a restraint system for protecting the people in the vehicle being deployed if the deployment thresholds are exceeded.

SUMMARY OF THE INVENTION

By contrast, the method according to the present invention for deploying a restraint system has the advantage that vehicle oscillations at right angles to the direction of driving, i.e., in the y direction, are also evaluated in order to detect a frontal collision. This oscillation is less pronounced in the case of low-speed collisions than in the case of higher-speed collisions. In the event of a collision and under certain initial conditions, the method according to the present invention uses the y signal that is determined in the restraint system's central control system to "sharpen" the deployment algorithm within a definable time window, so that in particular deployment performance at collision speeds of 40 to 64 km/h is improved. Herein, it is advantageous that the y acceleration signal and an integral of the y acceleration signal are evaluated, so that if necessary a value that is determined as a function of the y acceleration signal and of the integrated y acceleration signal is added to the x acceleration signal and the x integrator, respectively. Thus higher and lower deployment thresholds are reached more quickly, so that the restraint system is deployed early, which improves the safety of the occupants of the vehicle. Herein, the add-on in question is performed for a predefined time, after which the add-on is no longer performed.

It is especially advantageous that thanks to the evaluation of the acceleration signals at right angles to the direction of driving, in the event of misuses—i.e., abrupt driving maneuvers and no-fire (no-deployment) crashes—the method according to the present invention is disabled. In the case of large and heavy vehicles such as off-road vehicles and sport utility vehicles, in particular between 40 and 64 km/h very low deceleration values arise in the direction of driving, and, if in the case of these vehicles a deformable barrier is present, an airbag can only be reliably deployed via the basic algorithm starting from the fiftieth millisecond. Only after that instant is the barrier deformed so that the vehicle meets rigid resistance, and therefore only then does the vehicle undergo rapid deceleration. Thus a distinction relative to 15 km/h no-fire crashes can only be made reliably starting from that instant. This crash behavior is related to the relatively substantial weight of the vehicle—over 2 tons—and its rigid structure. However, it is desirable that for example a 64 km/h collision should result in deployment before 40 milliseconds have elapsed. As the deceleration in the direction of driving is insufficient for an early deployment decision without deploying for 15 km/h crashes as well, the central y acceleration signal is used as a further criterion. The y acceleration signal has modest dynamics overall, but in the case of a 40–64 km/h collision it is greater compared to the y acceleration signal for a 15 km/h collision. Two functions can be derived from this feature, which are the subject matter of the method according to the present invention: The integrator add-on function makes use of the influenceable absolute integrator of the central y signal, and under certain initial conditions performs add-ons to the integrator of the x acceleration. The absolute value of the y signal is used in the threshold pointer add-on function to perform add-ons to the threshold pointer of the x acceleration signal. Here, too, initial conditions are defined, e.g., so that the function is not activated if a misuse is involved. Furthermore, it is advantageous that the acceleration values and the corresponding integrated acceleration values at right angles to the direction of driving, i.e., the y acceleration values, are compared with a definable parameter, and if the acceleration values are greater than this parameter, the difference between the two values is calculated. The differences are then added up successively until the disable instant. Below, the summed values are referred to as the dynamics of the y acceleration signal. Add-ons to the x integrator are performed as a function of this dynamics of the y acceleration signal. The amount of the add-ons is predefined via a characteristic curve. The add-ons are performed starting from the instant at which the dynamics enters a definable time threshold window. The add-ons cease to be performed once the disable instant has been reached. Thus if the dynamics passes by the window, the function is disabled. If, by a first instant, the dynamics has reached higher values than the upper threshold, the function stays disabled, because a misuse is present, e.g., a hammer blow or a high-speed frontal crash having a large y component. Moreover, if, by a second instant, the dynamics reaches lower values than the lower dynamics threshold, the function is disabled, because a 15 km/h no-fire crash is present.

It is advantageous that the acceleration values are read in cyclically. Herein, the value that is greatest in terms of absolute value is held, and its amount is limited. This limiting is carried out within four time windows within which various limitation values are applied. The limited value is then added to the x acceleration value starting at the instant starting from which the limited value enters an applicable time threshold window. The add-ons cease to be performed once the disable instant or the interval time has been reached. If, by a third instant, the maximum value reaches a greater value than the upper threshold, the function stays disabled, because a misuse is present. Moreover, if, by a fourth instant, the maximum values reaches lower values than the lower dynamics threshold, the function is disabled, because a 15 km/h no-fire crash is present.

Furthermore, it is also advantageous that a device for carrying out the method according to the present invention is provided, the device having a controller, and acceleration sensors arranged centrally in the vehicle being present, these being used to determine the acceleration in the direction of driving and at right angles to the direction of driving. Herein, the acceleration sensors can be arranged either directly in the x and y directions or at an angle thereto, e.g., an angle of 45 degrees.

DETAILED DESCRIPTION

Figures 1, 2:
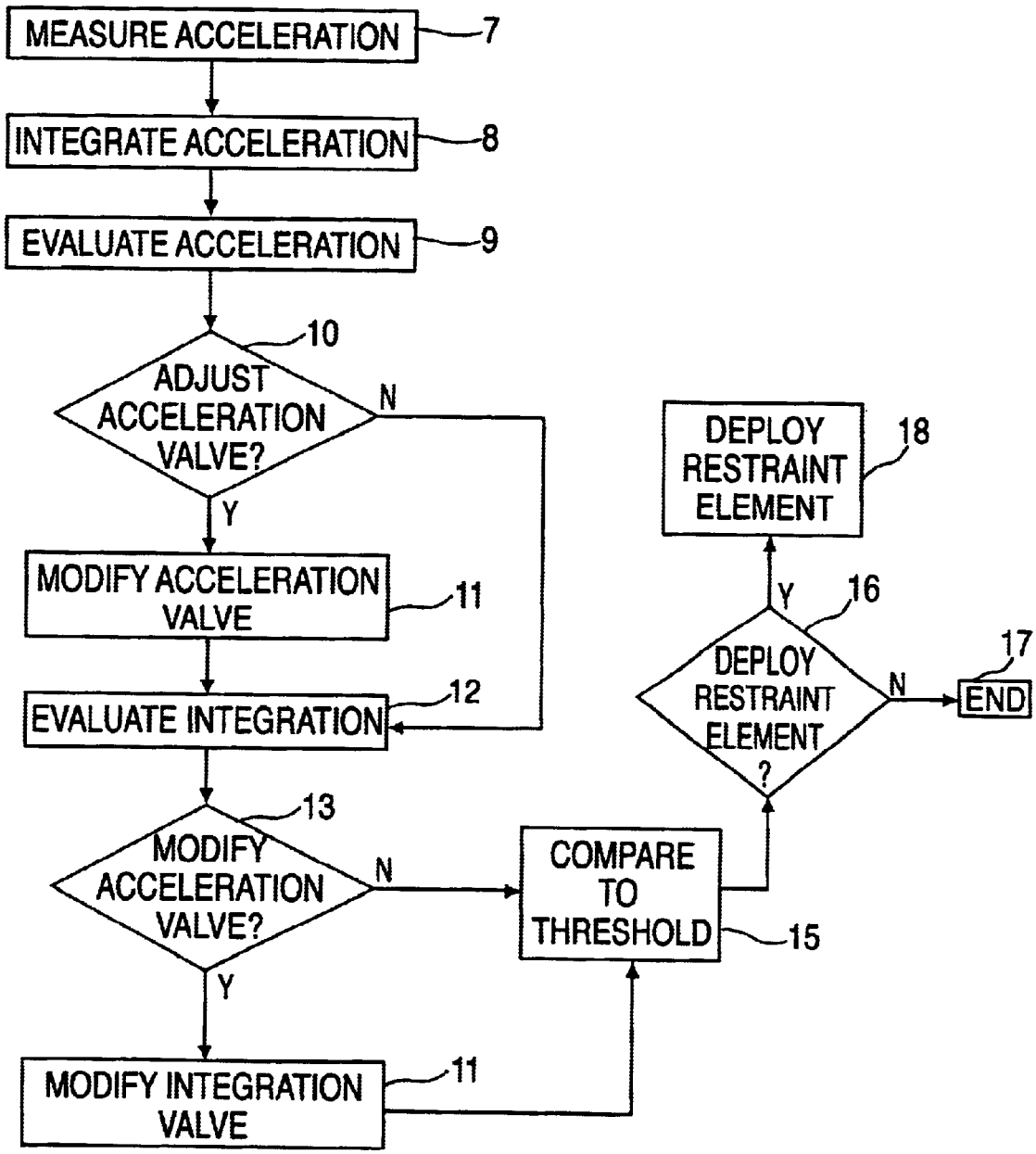
FIG. 1 is a block diagram of the device according to the present invention.
FIG. 2 is a flow chart for the method according to the present invention.

Below, x acceleration means acceleration in the direction of driving, and y acceleration means acceleration at right angles to the direction of driving. Misuse means abrupt driving maneuvers or no-fire crashes that are not supposed to deploy the restraints. FIG. 1 is a block diagram representing the device according to the present invention for carrying out the method for deploying a restraint system. Processor 1 of a controller receives, at its two data inputs, signals from acceleration sensors 2 and 3 which are arranged so that they measure the acceleration in the direction of driving, i.e., in the x direction, and at right angles to the direction of driving, i.e., in the y direction. Processor 1 is connected via a data input/output to interface component 4, which is the interface of the controller. Interface component 4 is connected via second data input/output and via bus 5 to restraint element 6. Restraint element 6 may include, for example, airbags or seat belt tensioning devices. In FIG. 2, the method according to the present invention for deploying a restraint system having restraint element 6 is shown as a flow chart. In method step 7, acceleration sensors 2 and 3 measure the acceleration in the x direction and in the y direction, i.e., in the direction of driving and at right angles to the direction of driving. Herein, acceleration sensors 2 and 3 amplify the measured signal, filter it and digitize it. The digital signal is then sent to processor 1 of the controller.

Figure 3:
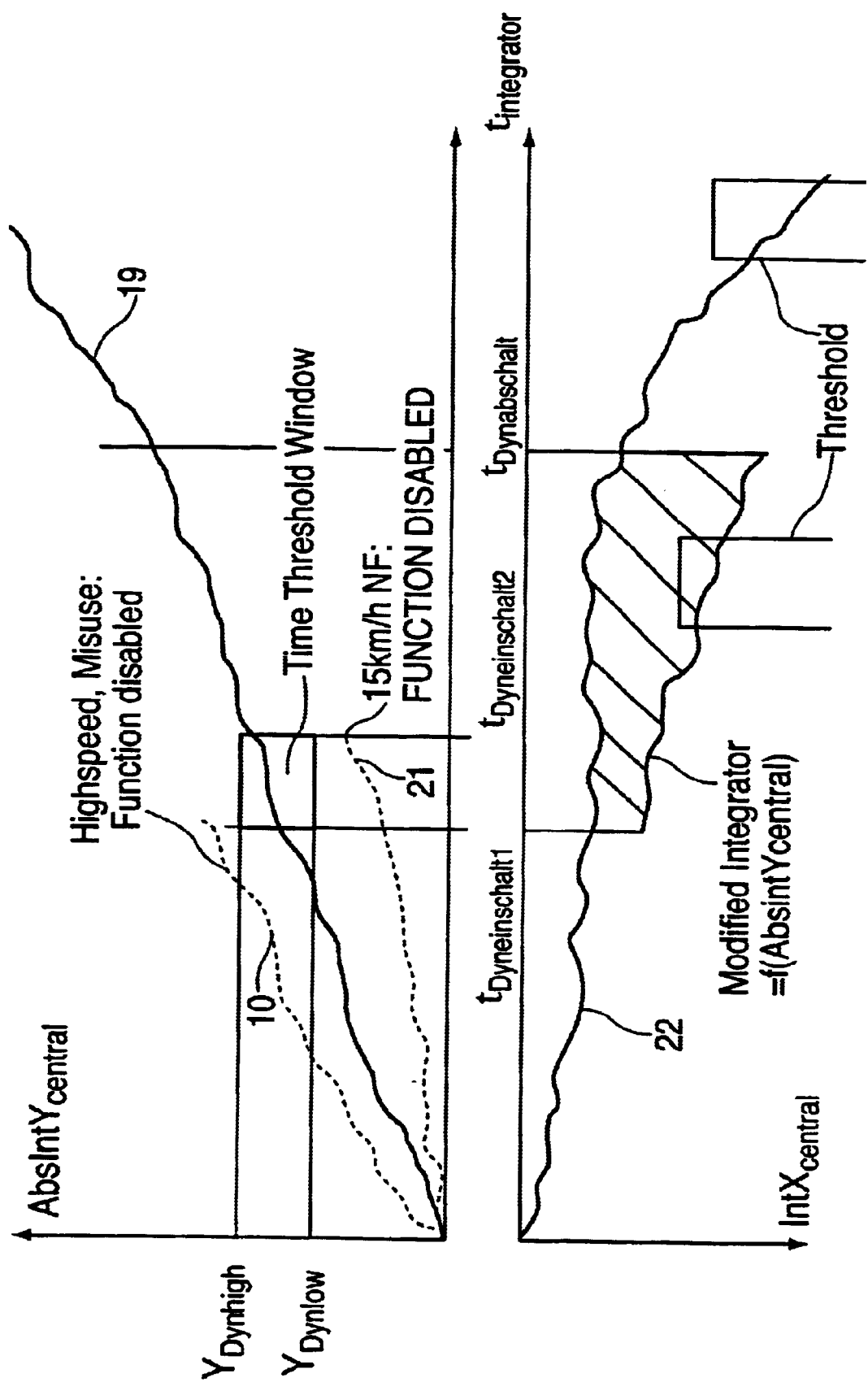
FIG. 3 shows two time diagrams showing assignment of the integrated acceleration value in the y direction and in the x direction.

In processor 1, integration of the acceleration signals is carried out in method step 8. In method step 9, the acceleration at right angles to the direction of driving, i.e., the y acceleration, is evaluated. If, in method step 10, it is determined that the y acceleration has taken on values so that an add-on to the x acceleration value is required, processing jumps to method step 11 in which the value of the y acceleration is added on to the x acceleration. If no add-on is required, processing jumps directly to method step 12, which follows method step 11. In method step 12, evaluation of the integrated acceleration in the y direction is carried out. In method step 13, a check is performed to determine whether or not an add-on to the integrated x acceleration signal is required. If it is required, in method step 14 an add-on in accordance with a given characteristic curve is performed as a function of the integrated y acceleration. Method step 14 is followed by method step 15, to which processing may also jump directly from method step 13 if no add-on is required. In method step 15, the acceleration signals in the x direction and the integrated acceleration signals in the x direction are compared with the deployment thresholds, so that in method step 16 a check can be performed to determine whether deployment of restraint element 6 is required. If so, in method step 18 the corresponding restraint element 6 is deployed. This message is sent via interface 4 and bus 5 to restraint means 6. If, in method step 16, it was determined that a deployment case is not present, the method ends in method step 17. The diagram in FIG. 3 shows the instances in which an add-on to the integrated x signal is performed. In particular, the instances in which no add-on is performed and the method according to the present invention is disabled are also shown. In the upper speed-time diagram, the integrated y acceleration signal is shown. Curves 19, 20, and 21 are three different instances of the integrated y acceleration signal. Cases 20 and 21 are cases in which the deployment algorithm is not "sharpened." "Sharpening" means the deployment threshold is lowered. Curve 20 reaches upper threshold $y_{Dynhigh}$ before instant $t_{Dyneinschalt1}$, because such behavior indicates a high speed collision with a rigid barrier or a misuse. Curve 21 is also a misuse. In this instance, lower threshold $Y_{Dynlow}$ has not been reached by $t_{Dyneinschalt2}$. This indicates that a low-speed collision is present, i.e., a 15 km/hour collision. Curve 19 represents a case in which a collision between 40 and 65 km/h has occurred, resulting in an add-on to the integrated x acceleration signal. Then, at instant $t_{Dynabschalt}$, the method according to the present invention is disabled.

If the x acceleration signal exceeds the noise threshold, the method according to the present invention is enabled. The acceleration values in the y direction are read in cyclically by processor 1 and compared with definable acceleration value K. If the absolute value of the acceleration value in the y direction is greater than the value K, the difference between the two values is calculated. The differences are then successively summed until disable instant $t_{Dynabschalt}$. Below we refer to the summed values as the dynamics of the y signal. Add-ons to the integrated x acceleration signal are performed as a function of the dynamics of the y signal. The amount of the add-ons is defined by an applicable characteristic curve. The add-ons are performed starting at the instant at which the dynamics enters a definable window. The dynamics are within the times $t_{Dyneinschalt1}$ and $t_{Dyneinschalt2}$ and within thresholds $y_{Dynlow}$ and $y_{Dynhigh}$. The add-ons cease to be performed once the disable instant $t_{Dynabschalt}$ has been reached. If the dynamics passes by the window, the function is disabled. The add-ons are performed out starting from the aforementioned instant in time window $t_{Dyneinschalt1}$ and $t_{Dyneinschalt2}$, provided curve 19 has not exceeded $y_{Dynhigh}$ by $t_{Dyneinschalt1}$ and threshold $y_{Dynlow}$ has been exceeded by curve 19 by $t_{Dyneinschalt2}$.

Thus the parameters than can be set are: $t_{Dyneinschalt1}$, $t_{Dyneinschalt2}$, $y_{Dynlow}$, $y_{Dynhigh}$, $t_{Dynabschalt}$, value K, and the characteristic curve for the integrator add-on. Curve 22, which in the lower diagram indicates the integrated x acceleration signal, is increased starting from instant $t_{Dyneinschalt1}$, and thus, between $t_{Dyneinschalt2}$ and $t_{Dynabschalt}$, reaches a deployment threshold that is indicated in the diagram as 'Threshold.'

Figure 4:
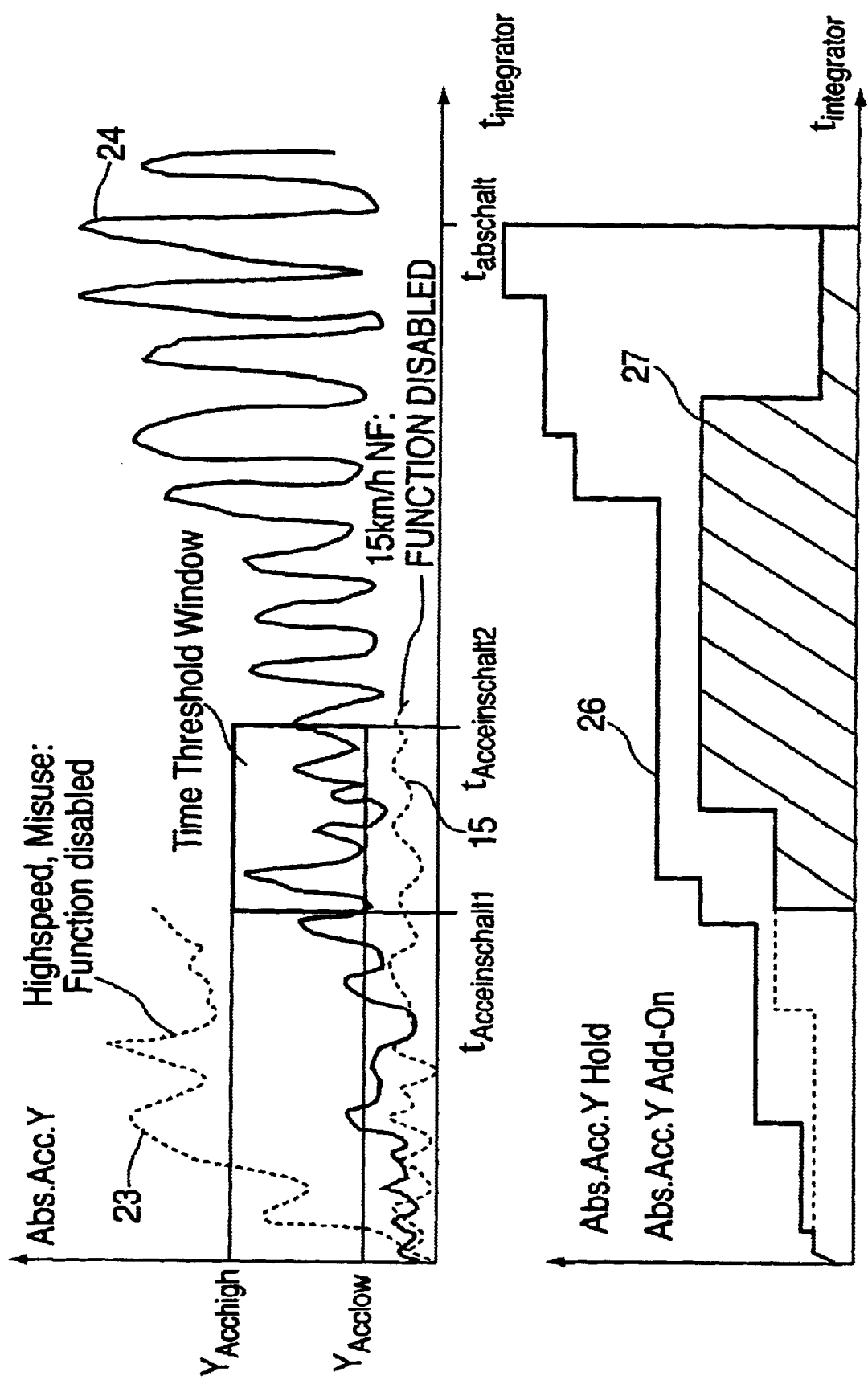
FIG. 4 shows two time diagrams showing, respectively, the y acceleration signal plotted against time and the add-on to the x acceleration signal plotted against time.

FIG. 4 shows how, in acceleration-time diagrams, the y acceleration signal results in an increase in the x acceleration signal. Curves 23, 24, and 25 indicate three different cases for the acceleration in the y direction, case 23 and case 25 being cases in which the function according to the present invention is disabled. Curve 23 represents a collision involving high speed or misuse, as upper threshold $y_{Acchigh}$ is reached before instant $t_{Acceinschalt1}$; curve 25 has not reached lower threshold $y_{Acclow}$ by time $t_{Acceinschalt2}$. Thus curve 23 represents a high-speed collision or a severe misuse, and curve 25 represents a collision at 15 km/h. Curve 24, on the other band, reaches the time threshold window and thus results in an add-on to the x acceleration. The function according to the present invention is not disabled until instant $t_{abschalt}$. The lower diagram shows the amount by which the x acceleration signal is incremented.

Acceleration values $AccY_{central}$ are read in cyclically. Herein, the value $AccY_{centralholdmax}$ that is the highest in terms of absolute value is held, and its amount is limited. Limiting is carried out within four time windows, within which limitation values are applied. Limited value $AccY_{centralholdbegrenzt}$ is then added to the threshold pointer of $AccX_{central}$ starting at the instant at which $AccY_{centralholdbegrenzt}$ enters an applicable time threshold window. In the present instance this is instant $t_{Acceinschalt1}$. The area that starts at the instant when the x acceleration signal is increased by curve 27 is shaded. Curve 26 indicates the held values of the y acceleration signal. The add-ons cease to be performed once the disable instant or the interval time have been reached. If maximum value $AccY_{centralholdmax}$ reaches a higher value than the upper threshold by $t_{Acceinschalt1}$, the function remains disabled, because a misuse is present, e.g., a hammer blow or a high-speed frontal crash having a large y component. Moreover, if maximum value $AccY_{centralholdmax}$ reaches values below lower dynamics threshold $Acc_{low}$ by instant $t_{Acceinschalt2}$, the function is disabled, because a 15 km/h no-fire crash is present. Add-ons are performed starting at instant $t_{Acceinschalt1}$ provided threshold $Y_{Acchigh}$ has not been exceeded by $Acc_{centralholdmax}$ by instant $t_{Acceinschalt1}$ and provided threshold $Acc_{low}$ has been exceeded by $AccY_{centralholdmax}$ by $t_{Acceinschalt2}$.

What is claimed is:

1. A method for deploying a restraint system, comprising the steps of:
    comparing at least one of an acceleration and a summed acceleration in a direction of driving to a predefined deployment threshold for deployment of the restraint system; and
    prior to the comparing, increasing the at least one of the acceleration and the summed acceleration in the direction of driving for a predefined period as a function of at least one of an acceleration and a summed acceleration at right angles to the direction of driving.

2. The method according to claim 1, wherein:
    the comparing and the increasing are initiated if a predefined noise threshold has been exceeded by an acceleration signal in the direction of driving.

3. The method according to claim 1, further comprising the steps of:
    comparing the at least one of the acceleration and the summed acceleration at right angles to the direction of driving to a specific parameter; and
    if the at least one of the acceleration and the summed acceleration at right angles to the direction of driving is greater than the specific parameter, continuously summing differences between the at least one of the acceleration and the summed acceleration at right angles to the direction of driving and the specific parameter in a specific predefined time window to produce a dynamics value, so that the at least one of the acceleration and the summed acceleration in the direction of driving is increased as a function of the dynamics value.

4. The method according to claim 3, wherein:
    the at least one of the acceleration and the summed acceleration in the direction of driving is increased if, in the specific predefined time window, the dynamics value is between a specific upper threshold and a specific lower threshold.

5. The method according to claim 4, further comprising the step of:
    after the specific predefined time window, ceasing a performance of the increasing of the at least one of the acceleration and the summed acceleration in the direction of driving.

6. The method according to claim 4, wherein:
    the increasing of the at least one of the acceleration and the summed acceleration in the direction of driving is not carried out if one of the following occurs:
        the at least one of the acceleration and the summed acceleration at right angles to the direction of driving reaches the specific upper threshold before a first instant,
        the at least one of the acceleration and the summed acceleration at right angles to the direction of driving remains below the specific lower threshold up until a second instant, and
        a third instant is reached.

7. The method according to claim 6, wherein:
    the increasing of the at least one of the acceleration and the summed acceleration in the direction of driving is not carried out if one of the following occurs:
        the at least one of the acceleration and the summed acceleration at right angles to the direction of driving reaches the specific upper threshold before a fourth instant,
        the at least one of the acceleration and the summed acceleration at right angles to the direction of driving remains below the specific lower threshold up to a fifth instant, and
        a sixth instant is reached.

8. A device for deploying a restraint system, comprising:
    a structure including a controller and acceleration sensors arranged centrally in a vehicle and for determining an acceleration in a direction of driving and an acceleration at right angles to the direction of driving, the controller being capable of being connected to a restraint system; and
    an arrangement for summing the acceleration in the direction of driving and the acceleration at right angles to the direction of driving.

* * * * *